Aug. 26, 1941.    A. KRAKAUER    2,254,106
SPRING LOCK
Filed May 3, 1940

INVENTOR
*Abraham Krakauer*
BY
ATTORNEY

Patented Aug. 26, 1941

2,254,106

UNITED STATES PATENT OFFICE 2,254,106

SPRING LOCK

Abraham Krakauer, Brooklyn, N. Y., assignor to Kay Manufacturing Corporation, Brooklyn, N. Y., a corporation of New York Application May 3, 1940, Serial No. 333,059

5 Claims. (Cl. 5—269)

This invention relates to spring structures such as those used in cushions, mattresses or the like and relates particularly to the means for locking together against shifting, the terminal coils of the marginal springs of the structure.

In spring structures using clips to secure together the corresponding end coils of adjacent springs there is less tendency for the adjacent end coils to shift relatively to each other than there is where helical springs extending across the structure are used for the same purpose. However, helical connecting springs have certain advantages over clips and are preferably used where possible. The helical springs as heretofore used, however, permit relative shifting of the end coils of the marginal springs of the structure and therefore do not maintain the edge of the cushion or mattress in which the spring structure is used, in its proper shape.

The present invention therefore contemplates the provision of a locking means having the advantages of a clip and formed integrally with the end portion of the helical connecting spring for locking the marginal springs against relative shifting in a spring structure wherein such helical springs form the connection means for the end coils of the various rows of coil springs.

My invention further contemplates the shaping of the end turns of a helical connecting spring by reducing the pitch of said turns and arranging them to draw together diverging parts of the crossed end coils of a pair of marginal springs past the outer-intersection of said end coils so as to slightly distort and tend to separate overlapped parts of said end coils and so that said parts are forced into tight frictional contact with the surrounding intermediate coils of the helical spring and material relative shifting of the end coils is thereby resisted and largely prevented and the edge of the spring structure maintained in its proper shape.

My invention further contemplates the provision of closely spaced end turns on the connecting helical spring of different pitch from the remaining turns, said closely spaced turns being arranged adjacent the outermost points of intersection of the crossed end coils of a pair of adjacent marginal springs whereby parts of said end coils are drawn together and the overlapped parts separated to create substantial friction between the overlapped parts and the helical spring.

Figure 1:
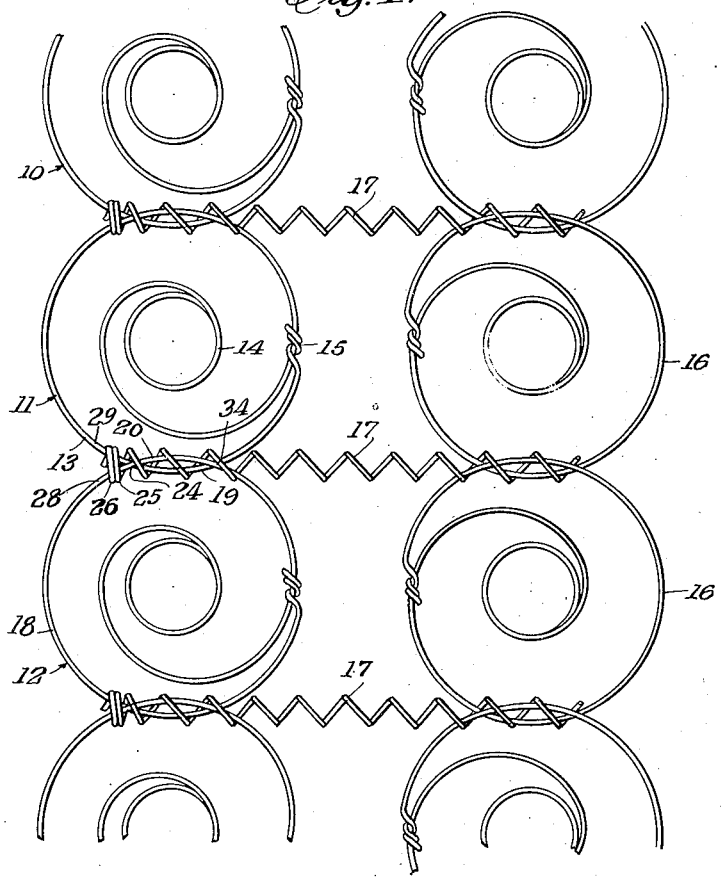

The various objects of the invention will be clear from the description which follows and from the drawing, in which, Fig. 1 is a fragmentary top plan view of the edge portion of a spring structure embodying my invention, the marginal springs being shown in a vertical row at the left of the figure.

Figure 2:
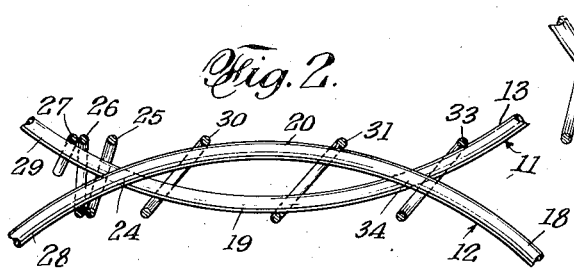

Fig. 2 is a fragmentary top plan view of adjacent parts of the end coils of adjacent marginal springs and of the end portion of the connecting helical spring showing how the overlapped parts of the coil springs are slightly distorted and forced into engagement with the surrounding turns of the helical spring.

Figure 3:
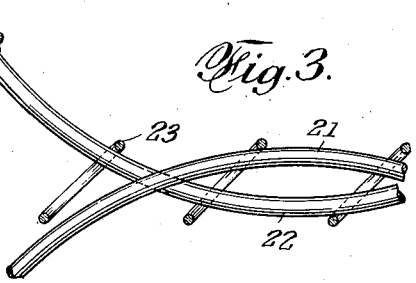

Fig. 3 is a similar view of the overlapped or crossed parts of the end coils of adjacent springs in intermediate rows showing the positions assumed by the parts and the intermediate coils of the helical springs when the overlapped portions of the end coils of adjacent springs are not forced apart, the end part of the helical spring being shown coiled around one of the end coils to illustrate the lack of proper locking action when the form shown is used for marginal springs.

In the practical embodiment of the invention shown by way of example, each of the springs as 10, 11 and 12 of the row at the edge or margin of the structure is preferably of the double cone type having an enlarged terminal coil as 13 or 18 at the top and bottom thereof, the intermediate coils 14 being reduced in diameter. The end portion of the end coil may be knotted in place as at 15 in the usual manner. The springs 16 of the intermediate rows of the structure each has its end coil crossed or overlapped with the end coils of adjacent springs, said end coils being held in place by the helical spring 17 wound or screwed thereabout in a manner which is well understood. Preferably, the row of intermediate springs 16 is spaced from the row of marginal springs 10, 11, 12.

The end coil 13 of the marginal spring 11 crosses or overlaps the corresponding end coil 18 of the adjacent marginal spring 12 on one side thereof and also crosses or overlaps the corresponding end coil of the marginal spring 10 on the other side thereof in substantially the manner in which the corresponding coils of the intermediate springs overlap.

If the helical spring 17 were merely wound or screwed around the overlapped parts 19 and 20 of the respective end coils 13 and 18, as is shown with respect to the end coils 21, 22 and the helical spring 23 in Fig. 3, said end coils 13 and 18 would shift comparatively easily relative to each other in the direction of the axis of the helical spring, whereby the edge of the spring structure would undesirably change in shape. I therefore provide a locking means for the end coils of the marginal springs, said means comprising the end part of the helical spring itself. This I do by winding two or more of the coils of the helical closely together at a point past the intersection 24 of the overlapped portions 19 and 20. That is, one coil 25 of the helical spring is arranged as closely as possible to the intersection 24 and the remaining coils 26 and 27 are wound quite closely to the coil 25. Since the outer portions 28 and 29 of the end coil diverge outwardly from the intersection 24, the coils 25, 26 and 27 of the helical spring pull the parts 28 and 29 toward each other shifting the normal position of the intersection if necessary so that where said coils 25, 26 engage said portions 28, 29, said portions cannot be spaced apart more than the innermost diameter of said coils. Such movement of the parts 28, 29 toward each other separates the overlapped parts 19 and 20 and causes said parts to be forced against and to firmly engage the intermediate coils 30, 31 and 33 of the helical spring in a manner quite different from the showing of Fig. 3 wherein the coils of the helical spring are not tightly engaged by the coils 21, 22. Spreading of the parts 19 and 20 creates such pressure against the coils 30, 31 and 33 and particularly against at least one of the coils as 31, as to substantially and effectively resist any tendency of the end coils 13 and 18 to move past each other in the direction of the axis of the helical spring 17.

The pressure of the helical coils 25, 26 and 27 upon the end coils of the marginal springs is usually sufficient to straighten to some extent or to distort the overlapped parts 19 and 20 slightly out of their normal shapes to carry said overlapped portions into firm frictional engagement with the intermediate coils of the helical spring. In other words, the radius of curvature of the parts 19 and 20 is increased under the action of the locking coils 25, 26 and 27. Preferably, the pitch of the helical spring is such that one of the coils as 33 thereof becomes arranged just beyond the inner point of intersection 34 of the end coils 13 and 18, said coil 33 thereby also tending to separate the overlapped parts 19 and 20 of the end coils. The pitch of the helical spring outwardly beyond the coil 30 thereof is, of course, greatly reduced and less than the pitch of the remaining inner part of said spring. The coils 30, 31 and 33 of the helical spring may become distorted somewhat out of alignment with the remaining coils under the pressure of the parts 19 and 20 but such distortion only serves to increase the resistance of the assembly against shifting.

I have found the construction above-described of the terminal part of the helical spring at the marginal springs effective as a practical locking means to prevent the undesirable shifting, hereinbefore mentioned, in a simple though inexpensive and efficient manner. It will be understood, however, that the shaping and arrangement of the end coils of the helical spring may be varied to some extent without departing from the spirit of the invention and within the scope of equivalents afforded by the appended claims.

I claim:

1. In a spring structure, a row of marginal coil springs, a row of intermediate coil springs, a helical connecting spring joining the end coils of a pair of adjacent intermediate springs and also joining the end coils of a corresponding pair of adjacent marginal springs, the end coils of the marginal springs being overlapped within the coils of the helical springs and crossing at two spaced points of intersection, and means for spreading apart and slightly straightening the overlapped parts of the end coils of the marginal springs out of their normal curvatures to force said parts into tight frictional engagement with the surrounding coils of the helical spring and thereby to lock said parts against relative movement, said means comprising a coil of the helical spring wound around diverging parts of the end coils of the marginal springs beyond the outer of said points of intersection and forcing said diverging parts toward each other within the confines of said coil of the helical spring, said coil having a lesser pitch than that of the first-mentioned coils of the helical springs within which the end coils of the marginal springs are overlapped.

2. In a spring structure having an intermediate row of coil springs and a marginal row of coil springs and having helical springs joining overlapped portions of the end coils of a corresponding pair of coil springs in each row, an end portion on the helical spring comprising a plurality of coils of lesser pitch than the pitch of the remainder of said helical spring, said end portion surrounding outer parts of the end coils of a pair of marginal springs at points beyond the outermost point of intersection of said end coils of the pair and outwardly beyond the overlapped portions thereof.

3. In a spring structure, a pair of adjacent marginal coil springs arranged with the corresponding end coils thereof crossed and overlapping and thereby providing two points of intersection of said coils, a helical spring having intermediate coils surrounding said overlapping portions and of normal pitch identical with that of the inner part of said helical spring and a plurality of coils at the end part of the helical spring of less than the normal pitch and surrounding diverging parts of said end coils beyond the outermost of said points of intersection and drawing said diverging parts together and forcing the overlapping portions of the end coils apart and into pressed frictional engagement with the surrounding coils of the helical spring.

4. In a spring structure, a pair of marginal coil springs having their corresponding end coils overlapping, and a helical spring surrounding the overlapping portions of said end coils and terminating in a plurality of turns arranged outwardly of the overlapping portions and at diverging portions of said end coils, said turns drawing said diverging portions together to lock said end coils against relative shifting, and said turns having a lesser pitch than the pitch of the intermediate turns of the helical spring.

5. In a spring structure having marginal springs arranged with the end coils of one spring overlapping the corresponding end coils of the adjacent spring on each side thereof, a helical spring having coils of one pitch surrounding the overlapping portions of a pair of corresponding end coils of adjacent springs, and having terminal coils of lesser pitch surrounding diverging parts of said end coils outwardly beyond said overlapping portions.

ABRAHAM KRAKAUER.